US008035657B2

(12) United States Patent
Vau et al.

(10) Patent No.: US 8,035,657 B2
(45) Date of Patent: Oct. 11, 2011

(54) CAMERA AND METHOD FOR CREATING ANNOTATED IMAGES

(75) Inventors: Jean-Marie Vau, Paris (FR); Christophe E. Papin, Bois Colombes (FR); Olivier M. Rigault, La Celle St Cloud (FR); Thierry Lebihen, Bourg la Reine (FR); Olivier L. Seignol, Grenoble (FR); Olivier A. Furon, Dinard (FR); Nicolas P. Touchard, Suresnes (FR)

(73) Assignee: Eastman Kodak Company, Rochester, NY (US)

( * ) Notice: Subject to any disclaimer, the term of this patent is extended or adjusted under 35 U.S.C. 154(b) by 649 days.

(21) Appl. No.: 11/571,570

(22) PCT Filed: Jun. 13, 2005

(86) PCT No.: PCT/EP2005/006308
§ 371 (c)(1),
(2), (4) Date: Jan. 3, 2007

(87) PCT Pub. No.: WO2006/002745
PCT Pub. Date: Jan. 12, 2006

(65) Prior Publication Data
US 2007/0258113 A1 Nov. 8, 2007

(30) Foreign Application Priority Data

Jul. 5, 2004 (FR) .................................. 04 07410

(51) Int. Cl.
*G09G 5/00* (2006.01)
(52) U.S. Cl. ......................... 345/629; 345/634; 345/636
(58) Field of Classification Search .................. 345/629, 345/634, 636
See application file for complete search history.

(56) References Cited

U.S. PATENT DOCUMENTS

| 5,740,801 | A  | * | 4/1998 | Branson ......................... 600/407 |
| 5,778,164 | A  | * | 7/1998 | Watkins et al. ............... 358/1.18 |
| 6,005,972 | A  |   | 12/1999 | Fredlund et al. |
| 6,054,990 | A  |   | 4/2000 | Tran |
| 6,269,366 | B1 | * | 7/2001 | Romano et al. ................... 707/6 |
| 6,317,141 | B1 | * | 11/2001 | Pavley et al. ................... 715/732 |
| 6,339,431 | B1 | * | 1/2002 | Ohmori et al. ................ 345/619 |
| 6,473,517 | B1 | * | 10/2002 | Tyan et al. .................... 382/105 |
| 6,671,395 | B1 |   | 12/2003 | Ott et al. |
| 6,681,045 | B1 |   | 1/2004 | Lapstun et al. |
| 7,065,705 | B1 | * | 6/2006 | Wang et al. ................... 715/209 |
| 2002/0051262 | A1 |   | 5/2002 | Nuttall et al. |

(Continued)

FOREIGN PATENT DOCUMENTS
WO WO 00/72125 11/2000

*Primary Examiner* — Xiao Wu
*Assistant Examiner* — David T Welch
(74) *Attorney, Agent, or Firm* — William R. Zimmerli; Peyton C. Watkins

(57) ABSTRACT

The invention relates to a method of annotation of images captured by a digital camera equipped with a previewing means, comprising:
the supply with the camera of an operating mode enabling a user to select one image (12) to be annotated, and to capture at least one additional previewed image; the automatic extraction (20) of an annotation (A) from the additional image; and the creation (22) of a new image by combining the annotation (A) and the image to be annotated (12), while respecting, in the new image, a location and enlargement ratio of the annotation virtually identical to those of the annotation in the additional image.

4 Claims, 4 Drawing Sheets

U.S. PATENT DOCUMENTS

| | | | |
|---|---|---|---|
| 2002/0054059 A1* | 5/2002 | Schneiderman | 345/700 |
| 2002/0105662 A1* | 8/2002 | Patton et al. | 358/1.9 |
| 2003/0012559 A1* | 1/2003 | Kusaka et al. | 386/98 |
| 2004/0255249 A1* | 12/2004 | Chang et al. | 715/723 |
| 2004/0263662 A1* | 12/2004 | Okisu et al. | 348/333.02 |
| 2005/0036036 A1* | 2/2005 | Stevenson et al. | 348/211.99 |

* cited by examiner

CAMERA AND METHOD FOR CREATING ANNOTATED IMAGES

FIELD OF THE INVENTION

The invention described in the present title relates to the creation of annotated images. Images, captured by portable equipment and transmitted to addressees electronically, are also called "electronic postcards". They have become a highly appreciated vector of exchange among digital camera users. This is especially the case for the users of portable digital devices combining telecommunication and camera functions. Among these devices, mention should be made of phonecams in particular. The invention relates to the customized annotation of images and electronic postcards.

BACKGROUND OF THE INVENTION

The growing number of phonecam users has developed a mode of communication by image. Just like sound or emails, the image is transmitted and reproduced by the user's portable equipment. Indeed phonecams or digital cameras usually have a small control screen capable of displaying images. Transmission to a home computer with a larger screen is of course possible.

The images or "electronic postcards" transmitted are created from digital photographs. They can be customized to carry an indication of the sender's personality. They can, for example, be annotated. However, because of modest size of the control interface or keyboard of portable equipment, such as phonecams, the entry of annotations is tiresome.

Devices or methods enabling manual annotations to be combined with images are known. One can refer for information to U.S. 2002/0051262 and U.S. Pat. No. 6,005,972. There again, relatively sophisticated interfaces are necessary. This includes, for example, a scanner, capable of reading a document bearing the annotations, or a touch screen on which the user writes the annotations using a light pen. An illustration of this is given by U.S. 2002/0051262. However, portable equipment, and in particular equipment intended for the general public, generally lacks these interfaces.

An additional difficulty, which appears at the time of annotating an image, is related to the determination of the relative dimension of the annotation compared to the image and the position of the annotation in the image. This difficulty is also due to the modest size of the control interface of portable equipment. The above-mentioned U.S. Pat. No. 6,005,972 proposes the creation of composite images including annotations. However, it provides for predetermined locations for carrying annotations.

The fact of predetermining locations for the annotations facilitates the operations which the user has to carry out, but reduces the creative possibilities on offer.

SUMMARY OF THE INVENTION

The purpose of the present invention is to propose a particularly user-friendly process for annotating images, intended to be implemented on digital cameras, and in particular phonecams.

One object is to propose a method enabling annotations, and in particular manual annotations, based on basic cameras, lacking a control keyboard or interface dedicated to this function.

Another goal is to propose a method enabling particularly creative annotation in which the user can, still without a dedicated control interface, control in a precise way the size and layout of the annotations in the image.

Another object is to propose a method enabling the optimum perception of this annotation, and whatever its position in the image and thus whatever the content (color, texture) surrounding the annotated zone.

It is also an object of the invention to propose a digital camera enabling image annotation in accordance with the method.

To achieve these objects, the invention more precisely aims to provide a method of annotation of images captured by a digital camera equipped with a control screen, comprising:
 the supply on the camera of an operating mode enabling a user to select at least one image, and to capture at least one additional image, capable of being previewed on the control screen,
 the automatic extraction of an annotation from the additional image, and
 the creation of at least one new image by combining the annotation and the image to be annotated, while respecting, in the new image, a location and enlargement ratio of the annotation substantially identical to those of the annotation in the additional image.

The annotation method can be implemented to annotate a single image or many images. In particular, many images of a video sequence can be annotated to create a sequence of annotated images.

"Annotation" means any element capable of being extracted from the additional image and introduced into the image to be annotated. This includes, for example, printed or handwritten characters, drawings, a signature, a logo, etc. The original colors associated with each design to be extracted can be identified and saved. It should be noted that the techniques of annotation extraction from an image are in themselves known. For information one can refer, for example, to U.S. Pat. No. 6,671,395.

The image to be annotated and the additional image may or may not have the same resolution. When the images to be annotated are captured by a camera different from that used to capture the additional image or when they are images from a video sequence, then their resolution is not necessarily the same as that of the additional image. The images can also have undergone previous modifications or operations. The process can thus comprise, if necessary, an additional step of processing consisting, for example, in resizing images, modifying their resolution or modifying the positioning of the annotation. This processing can take place at the time the new image is created, or before this step.

Thanks to the invention, when the user wishes to add a handwritten annotation to an image, he/she just writes the annotation on any writing support using any pencil or pen available. He/she then captures an image, in fact the additional image, by pointing the camera at the writing support that bears the annotation.

As the size and location of the annotation are respected, i.e. identical in the additional image and the new composite image created, these parameters can be controlled very simply by the user, without a control interface. Indeed, the location of the annotation is simply determined by moving the camera in relation to the support that bears the annotation. The position of the annotation can be controlled on the camera's previewing means. The previewing means comprises, for example, a viewer and/or small control screen.

In the same way, the size of the annotation can be simply determined by moving the camera towards or away from the support that bears the annotation. If the camera is equipped with a zoom, it is also possible to actuate the zoom to determine the size of the annotation.

Finally, when the annotation occupies the location and area desired in the additional image previewed on the control screen, the user can capture this image by actuating the camera release.

In order to further facilitate the positioning and dimensioning of the annotation in the final image, it is possible to envisage a combined display of the image to be annotated and the previewed additional image.

The two images can simply be superimposed. This can take place, for example, by means of a process of making the images transparent. In this case, and assuming that the image to be annotated I' and the additional image I" have the same resolution, the intensity associated with a pixel p located at a given position (x,y) in the composite image will depend on the intensities of the two pixels respectively positioned at (x,y) in the images I' and I". A conventional transparency function gives, for example, an equal contribution to the intensities of the two pixels in the end value.

As an alternative, a turn-by-turn display of the image to be annotated and the additional image, with sufficiently fast alternation to be able to assess the relative position of their iconic contents, can also be envisaged. Thus, the user can resize and position the annotation not only within the image frame, but also in relation to items of the iconic contents of the image to be annotated.

The additional image can be previewed as it is supplied by the camera's image sensor, or in a way to only show previously extracted annotations. Indeed, when the calculation capacities of the camera equipment are sufficient, the annotation can be extracted in real time from the additional image supplied by the camera, and displayed combined with the image to be annotated, during previewing. The real-time previewing step also enables the user, if necessary, to validate or easily modify the choice of color(s) used to display the annotations.

The image to be annotated can be selected by the user. This includes, for example, an image that the user has just captured in a normal shooting mode. The image to be annotated can also be an already annotated image, so as to add additional annotations. The image to be annotated can also be a previously captured image stored in a camera memory. The image to be annotated can be an image downloaded from a server of an image storage provider or an image received from another user of a digital camera equipped with image telecommunication means. Finally, the image to be annotated can amount to a simple uniform background on to which the annotation is superimposed.

The new composite image, which includes the image to be annotated and the annotation, can be created by combining the data of the image to be annotated with the image data of the annotation. However, this has the effect of doubling the image's digital weight. Another solution consists in including the annotation data in a fourth image layer added to the usual red, green and blue layers of the image to be annotated. The combination can also be carried out by replacing pixels of the image to be annotated with pixels of the annotations having the same co-ordinates in the additional image. This is then a fusion of the two images.

Yet another solution consists in using a video encoding format enabling short image sequences to be generated in which the contents of the annotated image appear gradually like live handwriting or drawing. For example, the use of an object-based video encoder like MPEG-4 enables annotated zones to be identified as being an object or a set of objects that can be identified and handled.

The invention also relates to a camera for implementing the method described above. In particular it is a digital camera comprising:

previewing means of an image containing an annotation,
extraction means of an annotation of the previewed image,
selection means of an image to be annotated, and
creation means of a composite image by combining the image to be annotated with the annotation.

The annotation extraction means, like the creation means of the composite image, can be provided by a computer built in to the camera, or by a remote computer with which the camera is in communication.

The composite image is preferably created to respect the location and dimensions of the annotation, in the above-mentioned manner.

The selection means of the image to be annotated comprise, for example, a control button or interface which enables image files stored in a memory to be scrolled through.

Finally, the previewing means can comprise a viewer or control screen on which the additional image and/or image to be annotated can be displayed. Simultaneous display, by superimposition, transparency, or alternation, can be envisaged as indicated above.

The camera can also comprise telecommunication means, and in particular radio means, giving access to a communication network, like the Internet. Access to a communication network enables the user to send the annotated images directly from his/her portable equipment to the electronic address of a chosen recipient.

The new composite image can, for example, be included in an MMS (Multimedia Messaging Service) type message for its transmission as an e-mail.

Other characteristics and advantages of the invention will appear in the following description, with reference to the figures in the appended drawings. This description is given purely as an illustration and is not limiting.

DETAILED DESCRIPTION OF THE INVENTION

In the following description, identical, similar or equivalent parts of the various figures are marked with the same references to facilitate reference between the figures. Further, the term "image" is used to describe a photographed scene, the displayed image, the captured image, and the image's digital data. Additional precision is only given when the description requires it for reasons of clarity.

Figure 1:
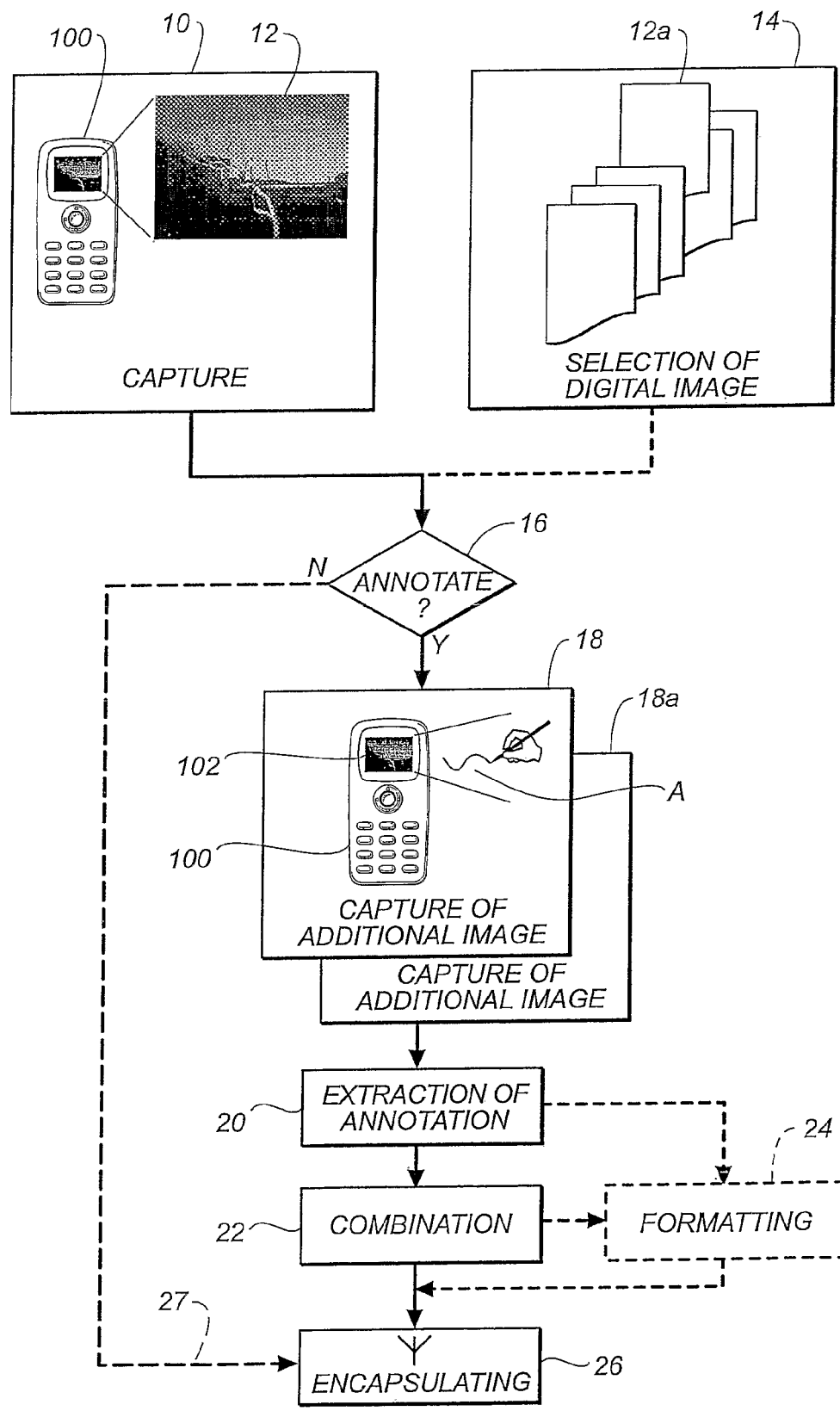
FIG. 1 is a flow chart illustrating a creation method of an electronic postcard with image annotation, using a method according to the invention.

A first step 10 of the flow chart of FIG. 1 is the capture of a digital image of a scene using a digital camera 100, in fact a phonecam. The captured image here constitutes the image to be annotated 12.

An image to be annotated 12a can also be taken from the camera's memory which contains image files of previously captured images or of images received by a telecommunication reception channel. Thus, step 14 of FIG. 1 illustrates the selection of the image to be annotated from among the images in memory. Selection can be performed by successively displaying images from the memory on the camera's control screen and by inviting the user to press a confirmation button when the desired image appears.

Following the capture or selection of the image, an additional option 16 is offered to the user to annotate or not the captured image. This choice is presented here as a binary choice. It is however possible to display a menu on the camera's control screen offering a choice among a greater number of options. In particular the menu can offer the option of integrating the image into a preset presentation format, for example, to convert it into an electronic postcard. The menu can further offer the option of saving the image, of ordering a hardcopy of the image, or, in fact, of annotating the image.

When the user decides to annotate the image, he/she is invited to capture an additional image containing the desired annotation. To this end, the user can, for example, write the desired annotation on a sheet of paper, and capture an image of the sheet of paper. The user can also capture an image from any other support that bears an inscription, printed letters, handwritten characters, drawing or any other item that the user wishes to add to the image as an annotation. This operation is shown as reference 18. The capture of the additional image is preceded by displaying the image supplied by the image sensor 104 of the camera 100 to enable control of the framing and enlargement of the image that the user is to capture. The display corresponds simply to the usual previewing mode of an image in the camera's viewer or control screen.

While the additional image is preferably captured after the image to be annotated, this order is not essential. Indeed, it is possible to separately capture additional images with annotations and images to be annotated, in any order, and to later carry out the option 16 of whether to proceed or not to the annotation. In this case the various images are saved, preferably in two separate registers of the memory.

Reference 20 denotes an important step of the invention that consists in extracting the annotation from the additional image. This step is described in more detail with reference to the following figures of the drawings. Extraction of the annotation can take place directly based on the additional image captured for the positioning and enlargement control of the annotation. A second additional image can also be captured that is not used for positioning the annotation or enlargement control, but simply for its extraction. The second additional image is, for example, a close up on the annotation or part of the annotation.

Extraction of the annotation 20 can also take place after the capture 18, 18a of the additional images. It can also take place before the capture, i.e. during the previewing, to enable a preview not of the additional image, but of a composite image created based on the image to be annotated and the annotation. However, greater computing power is required for this.

The digital data relating to the extracted annotation may be saved, for possible reuse as required for the later annotation of other images.

The method of FIG. 1 continues with the combination 22 of the image to be annotated and the annotation extracted from the additional image. The combination can have various forms. The annotation can be added as a second image to the image to be annotated. This results in a composite image whose digital weight is doubled compared with the initial image to be annotated. It simply contains twice as many pixels. A second possibility consists in making the annotation appear in a fourth layer of the image to be annotated as shown above; this fourth layer is added to the three layers that contain data corresponding to the red, green, and blue components respectively. Yet another solution consists in using, as mentioned above, a video encoding format enabling short image sequences to be generated in which the contents of the annotated image appear gradually like live handwriting or drawing.

An additional step 24 can comprise, according to the user's wish, other operations for formatting an electronic postcard or any other electronic document, based on the annotated image. This includes, for example, the insertion of a pre-recorded title or annotation; the creation of a margin or frame; or the conversion of a handwritten annotation into a font, etc. In particular, a handwritten annotation can be converted into a font by using character recognition software. Similarly, in the case of the prior use of character recognition tools, audio data corresponding to a synthesized voice reading the textual contents present in the extracted annotation can be added to the image data. These operations can be performed before, during, or after the creation of the combined image.

Finally, a last step 26, also optional, consists in encapsulating the combined image in an MMS (multimedia message service) and transmitting it to a recipient selected by the user. This step can also take place directly with the captured image 12, without annotations, as shown by the arrow 27.

Figure 2:
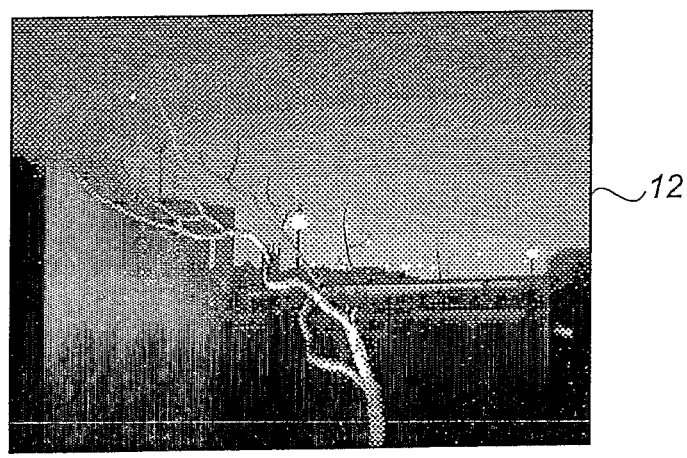
FIG. 2 represents an image to be annotated.
Figure 3:
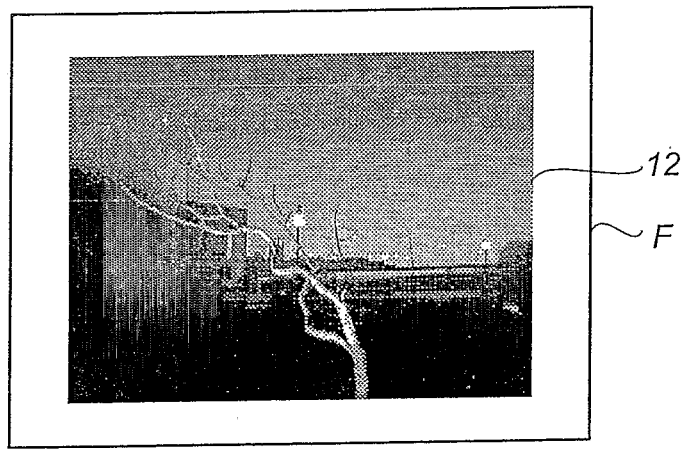
FIG. 3 represents the image to be annotated inscribed in an annotation frame.

FIG. 2 represents an image 12 captured by the user, and that the user wishes to annotate before transmitting it to a recipient of his/her choice or to a print services provider. The user then also has to capture an additional image containing an annotation. The annotation can be superimposed on the image, i.e. added into the image frame. It is also possible, as shown by FIG. 3, to define a frame F bigger than the image. In this case the annotation can be added beside the image while respecting the frame F. Pre-recorded additional inscriptions, not shown in FIG. 3, can also be added into the frame to create a customized electronic postcard.

Figure 4:
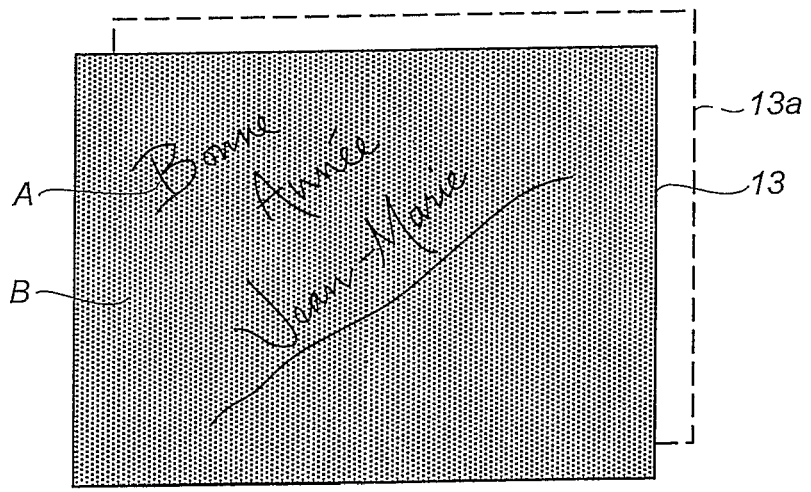
FIG. 4 represents an additional image captured by a user for the extraction of an annotation.

The additional image 13 is represented in FIG. 4. More exactly this is the image previewed on the camera's control screen, before its capture by the user. Here, this is the image of a sheet of paper on which the user has made an annotation. It may be seen that the annotation A is not very well distinguished from the background B of the image. This results, for example, from the fact that the annotation was made on colored paper. In general, patterns present on the writing support, such as squares or lines, or even the shadows cast on the support can be eliminated by a separation of the background and the signal to be extracted.

The annotation A is extracted from the additional image 13. This amounts to converting the additional image into a 1-bit image only reproducing the annotation. The annotation thus extracted can be combined with the first image 12, i.e. with the image to be annotated, so as to produce a composite image 15 represented in FIG. 5.

The result of the extraction can be a binary image for which the pixels forming the background have a set value, for example 0, and the pixels corresponding to the extracted signal have another value, for example 255. When one wishes to keep the annotations color information, all the values between 1 and 255 of the annotated contents can be saved, while continuing to assign the value 0 to the background. It is also possible to produce a table containing the location, and possibly the associated color, of each of the pixels of the extracted annotation.

The annotation can be extracted from the image 13 or from a second additional image 13*a*, drawn as a broken line in FIG. 4. As mentioned above, the second additional image corresponds, for example, to a close up on the annotation. The capture of the second additional image is shown as reference 18*a* in FIG. 1.

One annotation extraction option is described below with reference to FIGS. 6 to 9. The main difficulty in extracting an annotation from the additional image captured consists in distinguishing the annotation A from other interference items that may appear in the additional image. These are, for example, the lines or squares of a sheet of paper used to write the annotation on. This can also be the shadow cast by the user's hand holding the camera when capturing the additional image, etc.

Figure 6:
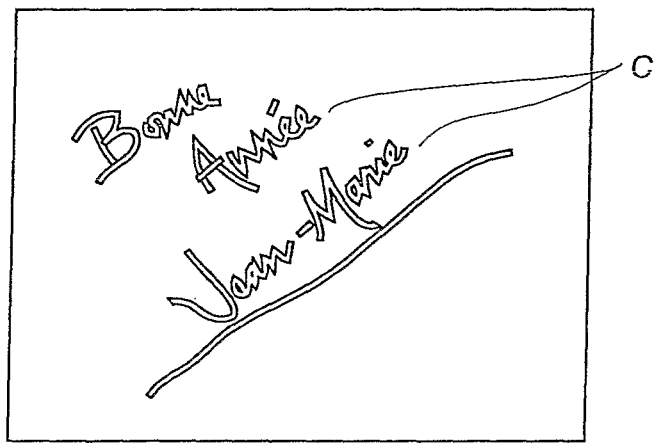
FIGS. 6, 7 and 8 illustrate the steps of an annotation extraction method.
Figure 7:
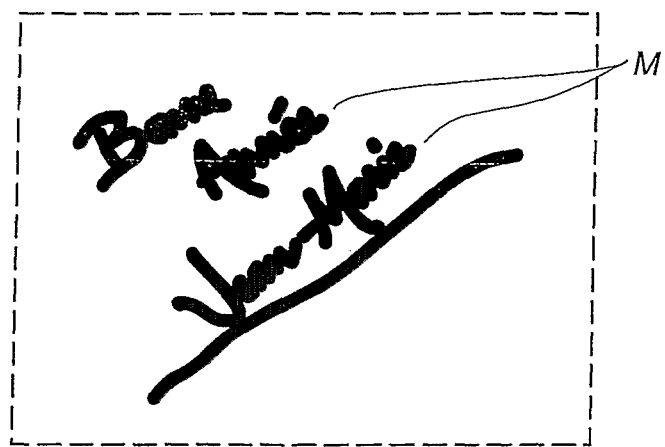

A first step of annotation extraction, shown in FIG. 6, consists in only retaining in the additional image those parts having the greatest spatial intensity gradients. More exactly, only zones whose spatial intensity gradient exceeds a threshold value are retained. The threshold value can be adjusted, for example, to be based on an analysis of the image contents, or else preset. This first step amounts to selecting the contours C in the image, whether light or dark. This enables the annotation to be selected by eliminating, for example, the shadows cast on the writing support. The first step also enables any grid lines to be rejected when they have lower spatial gradients than the annotation. However, a rejection of any grid lines or any other pattern of the support can be improved by additional appropriate processing. This is, for example, a search for regular and repeated structures and the rejection of these structures. The contours detected in the first step broadly delimit the annotated zones to be extracted. However, the thresholding carried out on the intensity gradient is also likely to eliminate part of the annotation corresponding to a less marked line. Also, this first step simply aims at broadly identifying the zones likely to contain annotations.

A second step consists in more accurately delimiting one or more annotated zones in the additional image. A morphological closing of the previously determined contours enables, for example, the selection of zones of the additional image not yet extracted that surround the contours C. These zones, also called "masks", are marked in FIG. 7 with the reference M. The zones of the additional image corresponding to the masks M are zones in which the probability of the presence of annotations to be extracted is high. More selective thresholding than the previous can thus be applied in these regions.

Figure 8:
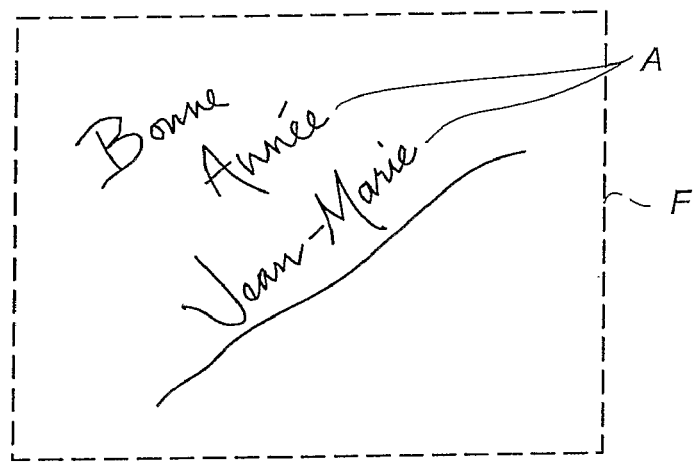

Also, a third step, illustrated by FIG. 8, consists in carrying out a thresholding operation on the additional image captured. The thresholding does not apply to the whole image, whose frame F is simply drawn as broken line, but only to the parts coinciding with the previously delimited masks M.

The thresholding is preferably intensity thresholding. It can be carried out by using an adjustable or preset threshold. It should be noted that the annotation extraction operations as described with reference to FIGS. 6, 7 and 8 can be carried out based on the full additional image or simply based on one layer or subset of color layers, i.e. only certain color components of the image. Indeed, the additional image is a digital image, which when in color is capable of being separated into several color layers. According to the color used to write the annotation on a support, the extraction can be facilitated by only retaining one of the color layers. The extraction can be carried out separately for three color layers, and the annotation can be retained for the color layer in which the contrast or intensity gradients are greatest.

The extracted annotation is then combined with the image to be annotated in the above-mentioned manner. The annotation corresponds, in a preferred embodiment, to 1-bit, all-or-nothing type data. It can be superimposed on the image to be annotated so as to appear in black, or any other color. In another embodiment, the annotation can be encoded on one or more bytes which enables higher quality information to be saved. In particular it can include the color linked to each pixel or again the value of other pixels extracted in the surrounding area of the pixel in question. As previously described, the combination of the annotation is carried out while respecting the location and size of the annotation. Thus, one pixel of the annotation has, for example, the same coordinates in the additional image and the composite image 15.

Figure 5:
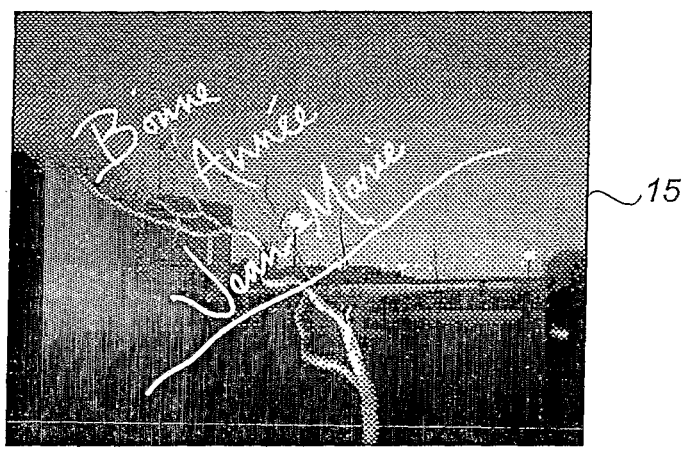
FIG. 5 demonstrates a composite image combining the image to be annotated and an annotation extracted from the additional image.

In the example of FIG. 5, whose background is relatively dark, the annotation is added in white, so as to improve the visual contrast. In general, the annotation can be added in black on a light background, in white on a dark background or in a color that is complementary to the colors of the image to be annotated. In a more improved way, each pixel of the annotation can be set to a light and color value enabling optimum color and light contrast to be obtained compared with the neighboring pixels of the image to be annotated.

Other methods of annotation extraction of the additional image can be envisaged. For information, one can refer to U.S. Pat. No. 6,671,395.

Figure 9:
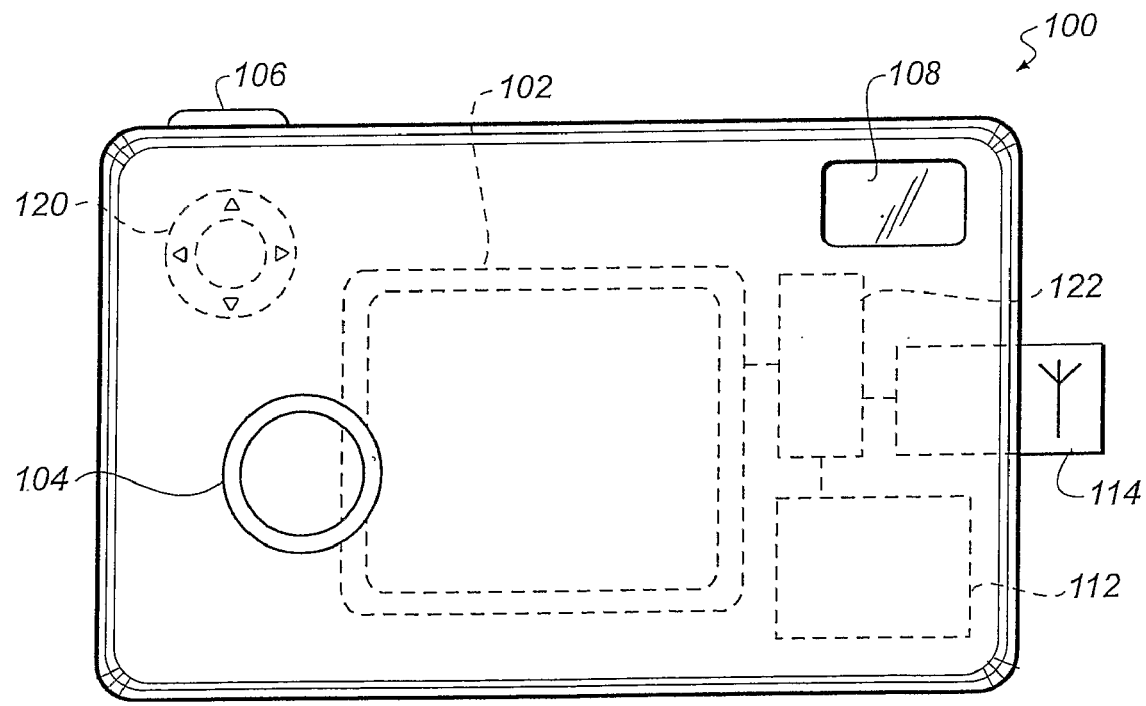
FIG. 9 is a simplified schematic representation of a camera for implementing the invention method.

FIG. 9 is a simplified schematic representation of a digital camera 100 for implementing the annotation method. It comprises an image sensor 104, a release 106, a viewer 108, and a control screen 102 on the opposite side to the sensor 104. The control screen is drawn with a broken line, because it is on the side opposite that shown in the figure.

The camera also comprises a memory 112 to save the captured images and any images received by telecommunication channel. Indeed, the camera has a telecommunication module 114 capable of linking the camera to a communication network like the Internet. This communication link enables images to be transmitted and received remotely. These are images with or without annotations. The module 114 is preferably a radio module that can also be used for voice transmission when the camera includes telephone or messaging functions.

Reference 120 denotes a selection button enabling a user to choose between a shooting mode and an annotation mode. In fact this is a multi-function control that also enables the user to select an image to be annotated from among the images saved in the memory 112, or to select images including annotations.

Reference 122 denotes a computer programmed or cabled to manage the annotation extraction and the creation of the composite image. The computer can be a central processing unit for the camera's various functions.

The invention claimed is:

1. A digital camera comprising:
   (a) an image sensor for capturing images;
   (b) memory for storing a plurality of captured images;
   (c) a control screen for displaying the captured images;
   (d) at least one menu user control for selecting a particular captured image and for selecting an annotation mode; and
   (e) a processing unit, responsive to the selection of the annotation mode following the selection of a particular captured image, which initiates the capture, processing, and display of a series of preview images of a writing support that bears an annotation to enable the user to annotate the particular captured image, and wherein the processing includes automatically extracting annotation information from at least one of the series of preview images;

wherein the display provides a composite image including the particular captured image and the extracted annotation information to permit a user of the digital camera to control the size of the annotation information relative to the particular captured image by moving the camera towards or away from the writing support, and wherein the processing unit, responsive to the activation of the user control for initiating capture of a still image, following the selection of the annotation mode, captures a still image having the annotation, extracts the annotation information from the still image and stores the annotation information in the memory for later use with the particular image.

2. The digital camera as in claim 1 further comprising a zoom for altering a size of the annotation.

3. The digital camera as in claim 1, wherein the annotation is stored as an additional layer of the particular captured image.

4. The digital camera as in claim 1, wherein the digital camera is a phonecam.

* * * * *